United States Patent
Yang et al.

(10) Patent No.: US 12,362,666 B2
(45) Date of Patent: Jul. 15, 2025

(54) SEMICONDUCTOR DEVICE

(71) Applicants: Samsung Electronics Co., Ltd., Suwon-si (KR); KOREA ADVANCED INSTITUTE OF SCIENCE AND TECHNOLOGY, Daejeon (KR)

(72) Inventors: Junhyeok Yang, Suwon-si (KR); Jeong-Hyun Cho, Daejeon (KR); Jeongpyo Park, Suwon-si (KR); Tae-Hwang Kong, Suwon-si (KR); Hyun-Sik Kim, Daejeon (KR); Hong-Hyun Bae, Daejeon (KR)

(73) Assignees: SAMSUNG ELECTRONICS CO., LTD., Suwon-si (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 386 days.

(21) Appl. No.: 18/153,446

(22) Filed: Jan. 12, 2023

(65) Prior Publication Data
US 2023/0223844 A1    Jul. 13, 2023

(30) Foreign Application Priority Data

Jan. 13, 2022  (KR) .................. 10-2022-0005062
May 20, 2022  (KR) .................. 10-2022-0062174

(51) Int. Cl.
*H02M 3/02* (2006.01)
*H02M 3/07* (2006.01)
*H02M 3/158* (2006.01)

(52) U.S. Cl.
CPC ............. *H02M 3/07* (2013.01); *H02M 3/158* (2013.01)

(58) Field of Classification Search
CPC .......... H02M 3/07; H02M 3/158; H02M 3/02; H02M 3/157
See application file for complete search history.

(56) References Cited

U.S. PATENT DOCUMENTS

| 8,792,254 | B2 | 7/2014 | Reddy |
| 9,548,661 | B2 | 1/2017 | Ryotaro et al. |
| 10,177,654 | B1 | 1/2019 | Chang et al. |

(Continued)

FOREIGN PATENT DOCUMENTS

| JP | 4427667 B2 | 12/2009 |
| JP | 2021093819 A | 6/2021 |
| KR | 102169381 B1 | 10/2020 |

*Primary Examiner* — Adolf D Berhane
(74) *Attorney, Agent, or Firm* — Myers Bigel, P.A.

(57) ABSTRACT

A semiconductor device may include: a flying capacitor connected between a first node and a second node; a first inductor having a first end connected to the flying capacitor through the first node and a second end connected to an output node; and a second inductor having a first end connected to the flying capacitor through the second node and a second end connected to the output node, wherein the semiconductor device is configurable in a plurality of different states based on a plurality of different operational phases, and wherein the flying capacitor is configured to float in a first phase, is configured to be discharged through the first inductor in a second phase that is different from the first phase, and is configured to be charged through the second inductor in a third phase that is different from the first phase and the second phase.

20 Claims, 15 Drawing Sheets

(56) References Cited

U.S. PATENT DOCUMENTS

| | | |
|---|---|---|
| 10,700,607 B2 | 6/2020 | Chen et al. |
| 10,797,593 B1 * | 10/2020 | Ke .......................... H02M 3/07 |
| 2021/0184594 A1 | 6/2021 | Shen et al. |

* cited by examiner

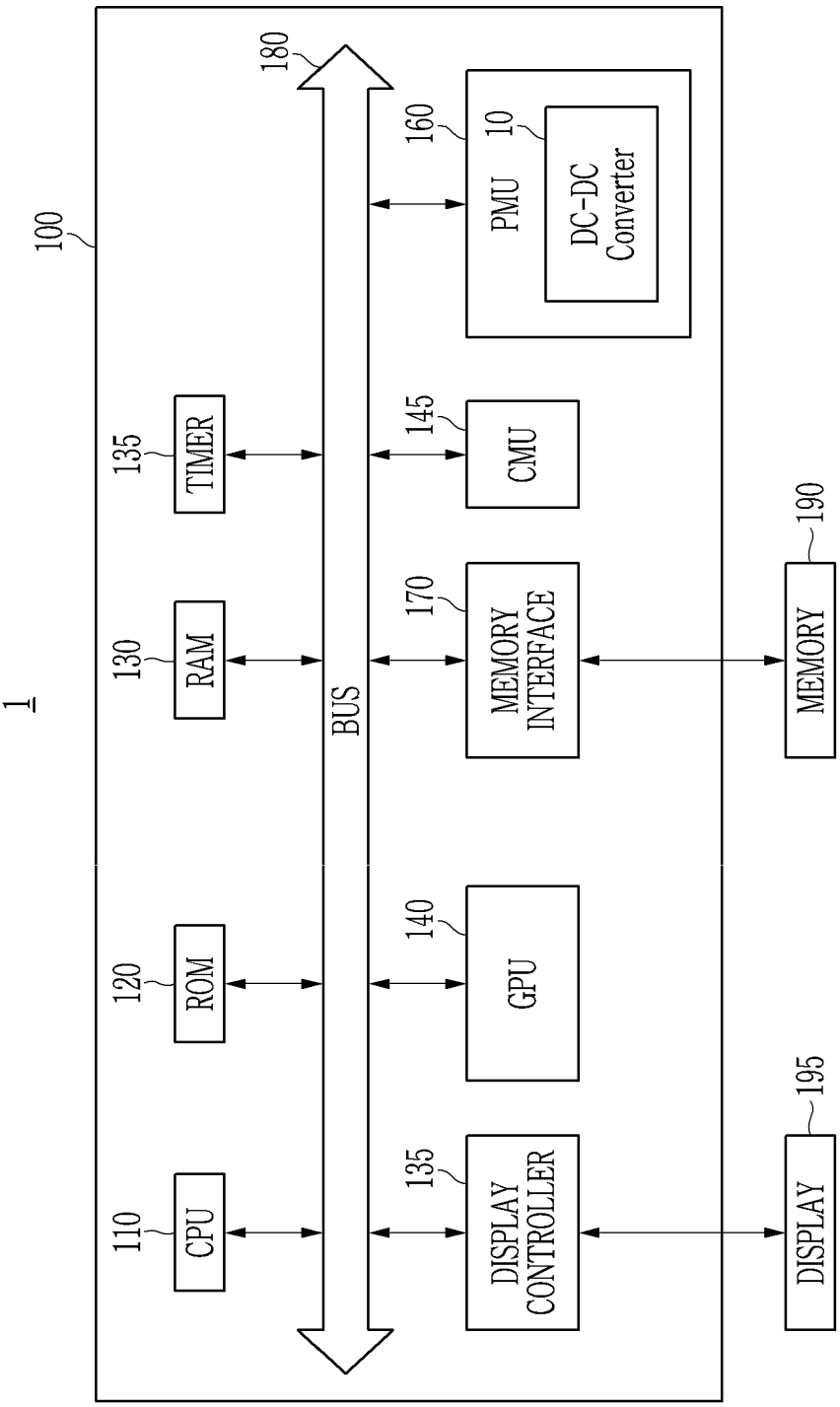

SEMICONDUCTOR DEVICE

CROSS-REFERENCE TO RELATED APPLICATIONS

This application claims priority to and the benefit of Korean Patent Application No. 10-2022-0005062 filed in the Korean Intellectual Property Office on Jan. 13, 2022, and Korean Patent Application No. 10-2022-0062174 filed in the Korean Intellectual Property Office on May 20, 2022, the entire contents of which are incorporated herein by reference.

BACKGROUND

(a) Field

The present disclosure relates to semiconductor devices.

(b) Description of the Related Art

To achieve energy-efficient high-performance computing (HPC) processing, a power management integrated circuit (PMIC) may fluently supply power and provide high-rate dynamic voltage scaling (DVS) based on a data processing load. For this purpose, a completely integrated system-on-chip (SoC) may be used, and an integrated voltage regulator (IVR) may also be used. However, a current imbalance problem based on a mismatch between phases in the high-power multi-channel IVR may generate a large conduction loss. As a result, balancing converters that may mitigate current imbalances in real-time may be investigated.

SUMMARY

Embodiments of the inventive concept may provide a semiconductor device that may mitigate a current imbalance while using a relatively small number of capacitors.

An embodiment of the present disclosure provides a semiconductor device including: a flying capacitor connected between a first node and a second node; a first inductor having a first end connected to the flying capacitor through the first node and a second end connected to an output node; and a second inductor having a first end connected to the flying capacitor through the second node and a second end connected to the output node, wherein the semiconductor device is configurable in a plurality of different states based on a plurality of different operational phases, the flying capacitor may be configured to float in a first phase, may be configured to be discharged through the first inductor in a second phase that is different from the first phase, and may be configured to be charged through the second inductor in a third phase that is different from the first phase and the second phase.

In the first phase, the first inductor may be electrically connected to an input node through the first node, the second inductor may be electrically connected to the input node through the second node, and the first inductor and the second inductor may be energized by a difference that is a subtraction of an output voltage at the output node from an input voltage provided by the input node.

The semiconductor device may further include: a first connection switch between the input node and the first node; and a second connection switch between the input node and the second node, wherein the first connection switch and the second connection switch may be in an on state in the first phase.

In the second phase, the first inductor may be electrically connected to the flying capacitor through the first node, and the first inductor may be de-energized by a difference between a voltage at the flying capacitor and the output voltage.

A first applying voltage for the first inductor applied to the first node may be 0.5 times the input voltage.

The semiconductor device may further include: a third connection switch between a third node connected to the flying capacitor and the ground node, wherein the third connection switch may be in the on state in the second phase.

In the third phase, the second inductor may be electrically connected to the flying capacitor through the second node, and the second inductor may be de-energized by a difference between the input voltage and a sum of the voltage at the flying capacitor and the output voltage.

A second applying voltage for the second inductor applied to the second node may be 0.5 times the input voltage.

The semiconductor device may further include: a fourth connection switch between a third node connected to the flying capacitor and the second node, wherein the fourth connection switch may be in the on state in the third phase.

When a first inductor current of the first inductor becomes greater than a second inductor current of the second inductor, a voltage at the flying capacitor may be reduced so that the first inductor current becomes identical to the second inductor current, and when the first inductor current of the first inductor becomes less than the second inductor current of the second inductor, the voltage at the flying capacitor may be increased so that the first inductor current becomes identical to the second inductor current.

Another embodiment of the present disclosure provides a semiconductor device including: a first connection switch configured to selectively supply an input voltage to a first inductor and a first end of a flying capacitor; a second connection switch configured to selectively supply a ground voltage to a second end of the flying capacitor; a third connection switch configured to selectively supply the input voltage to a first end of a second inductor; and a fourth connection switch configured to supply a voltage at the second end of the flying capacitor to the first end of the second inductor.

In the first phase, the first connection switch and the third connection switch may be in an on state, the second connection switch and the fourth connection switch may be in an off state, and the first inductor and the second inductor may be energized by a difference between the input voltage and an output voltage at an output node, the first inductor being connected between the output node and the flying capacitor.

In the second phase, the second connection switch and the third connection switch may be in an on state, the first connection switch and the fourth connection switch may be in an off state, the first inductor may be de-energized by a difference between a voltage at the flying capacitor and an output voltage at an output node, the first inductor being connected between the output node and the flying capacitor, and the second inductor may be energized by a difference between the input voltage and the output voltage.

A first applying voltage for the first inductor may be 0.5 times the input voltage.

In the second phase, the first connection switch and the fourth connection switch may be in an on state, the second connection switch and the third connection switch may be in an off state, the first inductor may be energized by a difference between the input voltage and an output voltage at an output node, the first inductor being connected between the output node and the flying capacitor, and the second inductor may be de-energized by a difference between the input voltage and a sum of a voltage at the flying capacitor and the output voltage.

A second applying voltage for the second inductor applied to the second node may be 0.5 times the input voltage.

When a first inductor current of the first inductor becomes greater than a second inductor current of the second inductor, a voltage at the flying capacitor may be reduced so that the first inductor current becomes identical to the second inductor current, and when the first inductor current of the first inductor becomes less than the second inductor current of the second inductor, the voltage at the flying capacitor may be increased so that the first inductor current becomes identical to the second inductor current.

Another embodiment of the present disclosure provides a semiconductor device including: a first flying capacitor connected between a first node and a third node; a second flying capacitor connected between a fifth node and a seventh node; a first inductor having a first end connected to the first flying capacitor through the first node and a second end connected to an output node; a second inductor having a first end connected to the first flying capacitor through a first connection switch between a second node and a third node and a second end connected to the output node; a third inductor having a first end connected to the second flying capacitor through the fifth node and a second end connected to the output node; a fourth inductor having a first end connected to the second flying capacitor through a second connection switch between a sixth node and the seventh node and a second end connected to the output node; a third connection switch connected between the second node and the seventh node; and a fourth connection switch connected between the third node and the sixth node.

The fourth connection switch may be in an off state in an operation mode in which a first inductor current of the first inductor and a second inductor current of the second inductor are adjusted based on a voltage change of the first flying capacitor, and the fourth connection switch may be in an on state in an operation mode in which the first inductor current of the first inductor and a fourth inductor current of the fourth inductor are adjusted based on the voltage change of the first flying capacitor.

The third connection switch may be in an off state in an operation mode in which a third inductor current of the third inductor and a fourth inductor current of the fourth inductor are adjusted based on a voltage change of the second flying capacitor, and the third connection switch may be in an on state in an operation mode in which a second inductor current of the second inductor and a third inductor current of the third inductor are adjusted based on the voltage change of the second flying capacitor.

BRIEF DESCRIPTION OF THE DRAWINGS

FIG. 15 illustrates a block diagram of a semiconductor system according to an embodiment.

DETAILED DESCRIPTION OF THE EMBODIMENTS

Figure 1:
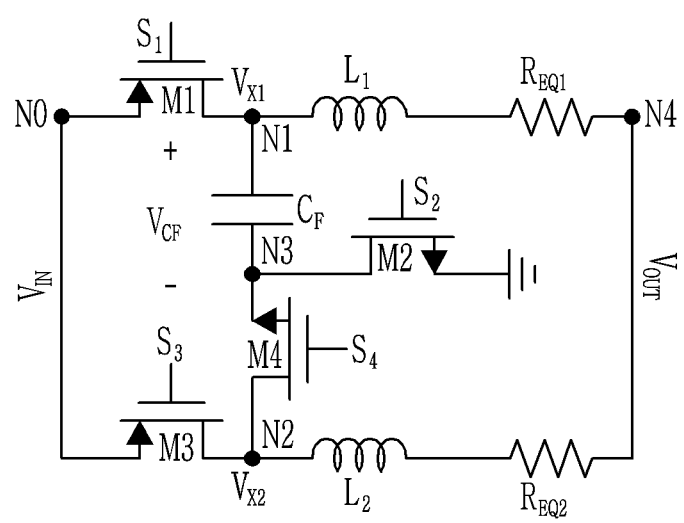
FIG. 1 illustrates a circuit diagram of a semiconductor device according to an embodiment.

In the following detailed description, certain embodiments of the present inventive concept have been shown and described by way of illustration. In the drawings, like numerals refer to like elements throughout this application and repeated descriptions may be omitted. It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present inventive concept. As used herein, the term "and/or" includes any and all combinations of one or more of the associated listed items. It is noted that aspects described with respect to one embodiment may be incorporated in different embodiments although not specifically described relative thereto. That is, all embodiments and/or features of any embodiments can be combined in any way and/or combination. As understood by those skilled in the art, the described embodiments may be modified in various different ways, all without departing from the spirit or scope of the present invention. Accordingly, the drawings and description are to be regarded as illustrative in nature and not restrictive. An expression recited in the singular may be construed as singular or plural unless the expression "one", "single", etc., is used.

FIG. 1 illustrates a circuit diagram of a semiconductor device according to an embodiment.

Referring to FIG. 1, the semiconductor device 10 is a multi-phase converter and it may be configured to convert a magnitude of a DC voltage. The semiconductor device 10 includes inductors $L_1$ and $L_2$, and it may be configured to supply inductor currents $I_{L1}$ and $I_{L2}$ to a load through the inductors $L_1$ and $L_2$. A phase interval between the inductor currents $I_{L1}$ and $I_{L2}$ may be 180 degrees, and a constant DC voltage may be applied to the load. The semiconductor device 10 may be operated by control of a control circuit for sensing the inductor currents $I_{L1}$ and $I_{L2}$ and an average current.

The semiconductor device 10 may include a flying capacitor $C_F$, a first inductor $L_1$, and a second inductor $L_2$. That is, the semiconductor device 10 may have a topology of "2L1C" in which two inductors $L_1$ and $L_2$ share one flying capacitor CF.

The semiconductor device 10 may be configurable in a plurality of different states based on a plurality of different operational phases, including a first phase, a second phase, and a third phase, and may control an output voltage $V_{OUT}$, while repeating the first phase, the second phase, and the third phase. For example, the semiconductor device 10 may repeat the first phase, the second phase, the first phase, and the third phase, and may control the output voltage $V_{OUT}$.

The flying capacitor $C_F$ may be operated in different states for respective phases. In detail, the flying capacitor $C_F$ may float in the first phase, may be discharged through the first inductor $L_1$ in the second phase, and may be charged through the second inductor $L_2$ in the third phase.

The flying capacitor $C_F$ may be connected between a first node N1 and a second node N2.

A first end of the first inductor $L_1$ may be connected to the flying capacitor $C_F$ through the first node N1, and a second end thereof may be connected to an output node N4.

A first end of the second inductor $L_2$ may be connected to the flying capacitor $C_F$ through the second node N2, and a second end thereof may be connected to the output node N4.

The semiconductor device 10 may include a first connection switch M1 between an input node N0 and the first node N1, a second connection switch M2 between a third node N3 connected to the flying capacitor $C_F$ and a ground node, a third connection switch M3 between the input node N0 and the second node N2, and a fourth connection switch M4 between a third node N3 connected to the flying capacitor $C_F$ and the second node N2.

The first connection switch M1 may be configured to selectively provide the input voltage $V_{IN}$ to the first inductor $L_1$ and the first end of the flying capacitor $C_F$, and the second connection switch M2 may be configured to selectively provide the ground voltage to the second end of the flying capacitor $C_F$. The third connection switch M3 may be configured to selectively provide the input voltage $V_{IN}$ to the first end of the second inductor $L_2$, and the fourth connection switch M4 may selectively provide a voltage at the second end of the flying capacitor $C_F$ to the first end of the second inductor $L_2$.

Equivalent resistors $R_{EQ1}$ and $R_{EQ2}$ of the semiconductor device 10 are also shown connected between the inductors L1 and L2, respectively, and the output node N4.

Figure 2:
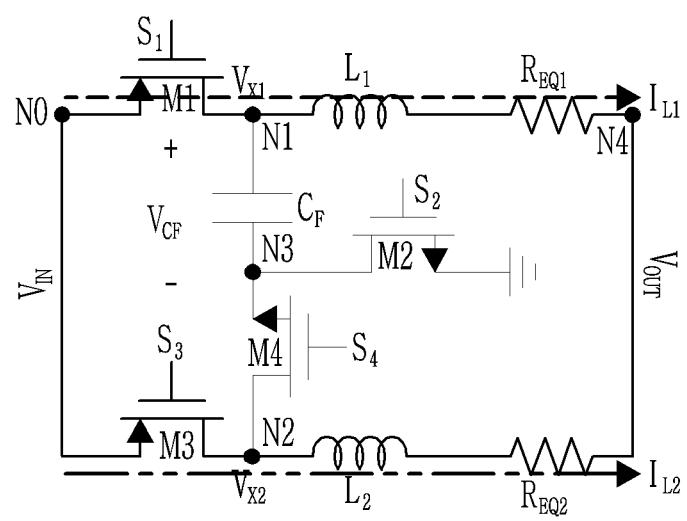
FIG. 2 and FIG. 3 illustrate an operation of a semiconductor device according to an embodiment.
Figure 3:
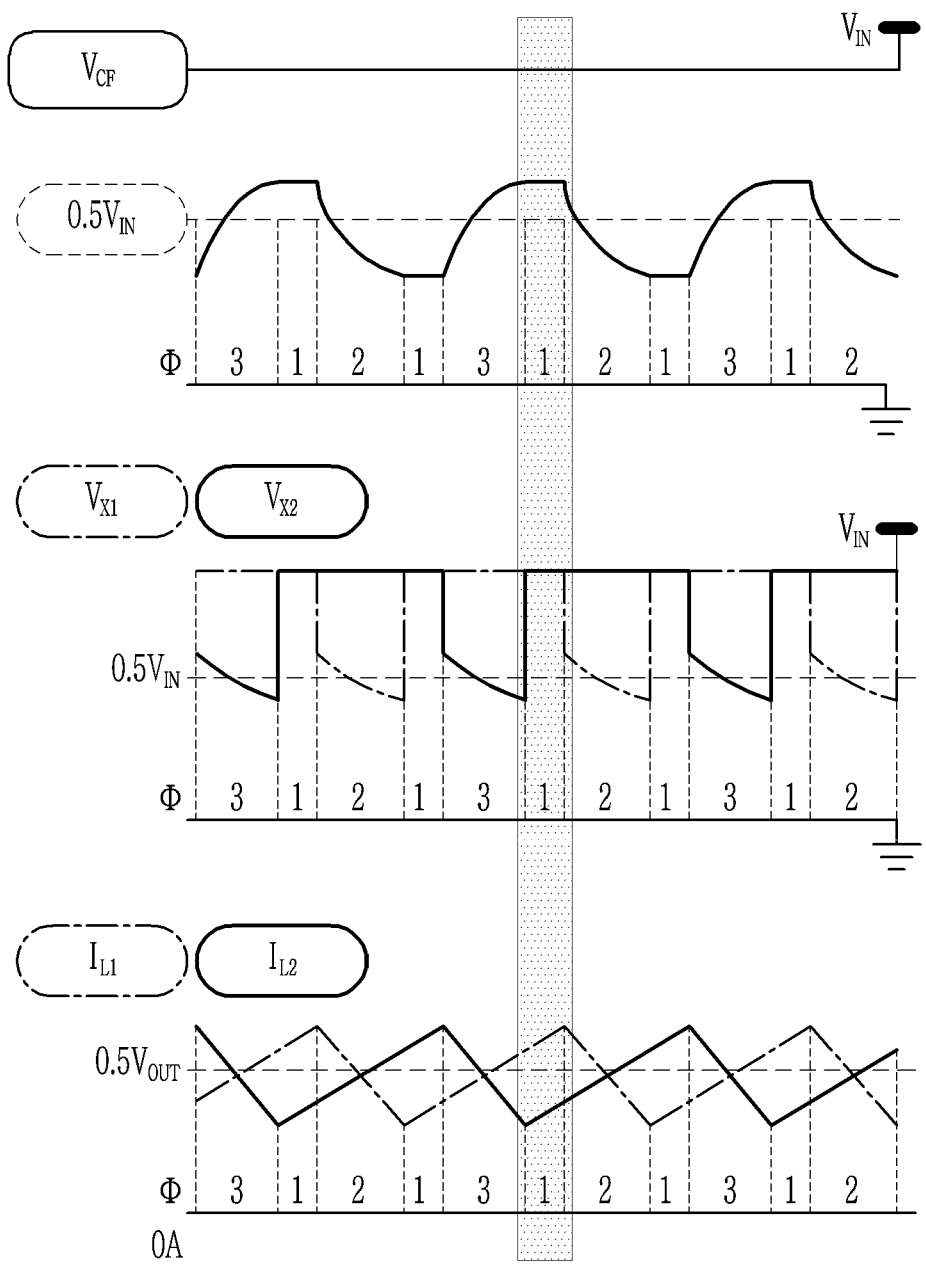

FIG. 2 and FIG. 3 illustrate an operation of a semiconductor device according to an embodiment.

Referring to FIG. 2, the semiconductor device 10 according to an embodiment may be operated in the first phase. In the first phase, the first connection switch M1 and the third connection switch M3 may be in an on state, and the second connection switch M2 and the fourth connection switch M4 may be in an off state.

In the first phase, the first inductor $L_1$ may be connected to the input node N0 through the first node N1, the second inductor $L_2$ may be connected to the input node N0 through the second node N2, and the first inductor $L_1$ and the second inductor $L_2$ may be energized by a potential difference that corresponds to a subtraction of the output voltage $V_{OUT}$ of the output node N4 from the input voltage $V_{IN}$ provided by the input node N0.

Referring to FIG. 3, the voltage $V_{CF}$ at the flying capacitor $C_F$ may have a value that is greater than 0.5 times the input voltage $V_{IN}$ in the first phase and may float. The first applying voltage $V_{X1}$ applied to the first node N1 and the second applying voltage $V_{X2}$ applied to the second node N2 may be equal to the input voltage $V_{IN}$. The first inductor current $L_A$ may increase in a region of a value that is greater than 0.5 times the output current $I_{OUT}$, and the second inductor current $I_{L2}$ may increase in a region of a value that is less than 0.5 times the output current $I_{OUT}$.

In this instance, the first inductor current $I_{L1}$ may flow through the On-state first connection switch M1, and the second inductor current $I_{L2}$ may flow through the On-state third connection switch M3. That is, the two switches may be in the on state.

Figure 4:
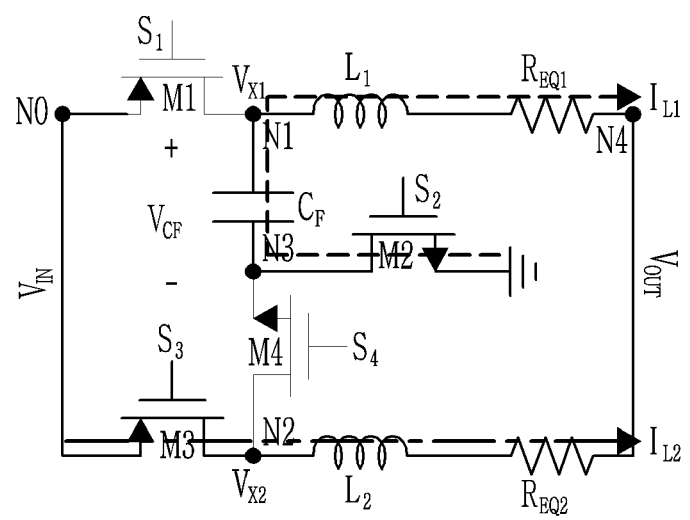
FIG. 4 and FIG. 5 illustrate an operation of a semiconductor device according to an embodiment.
Figure 5:
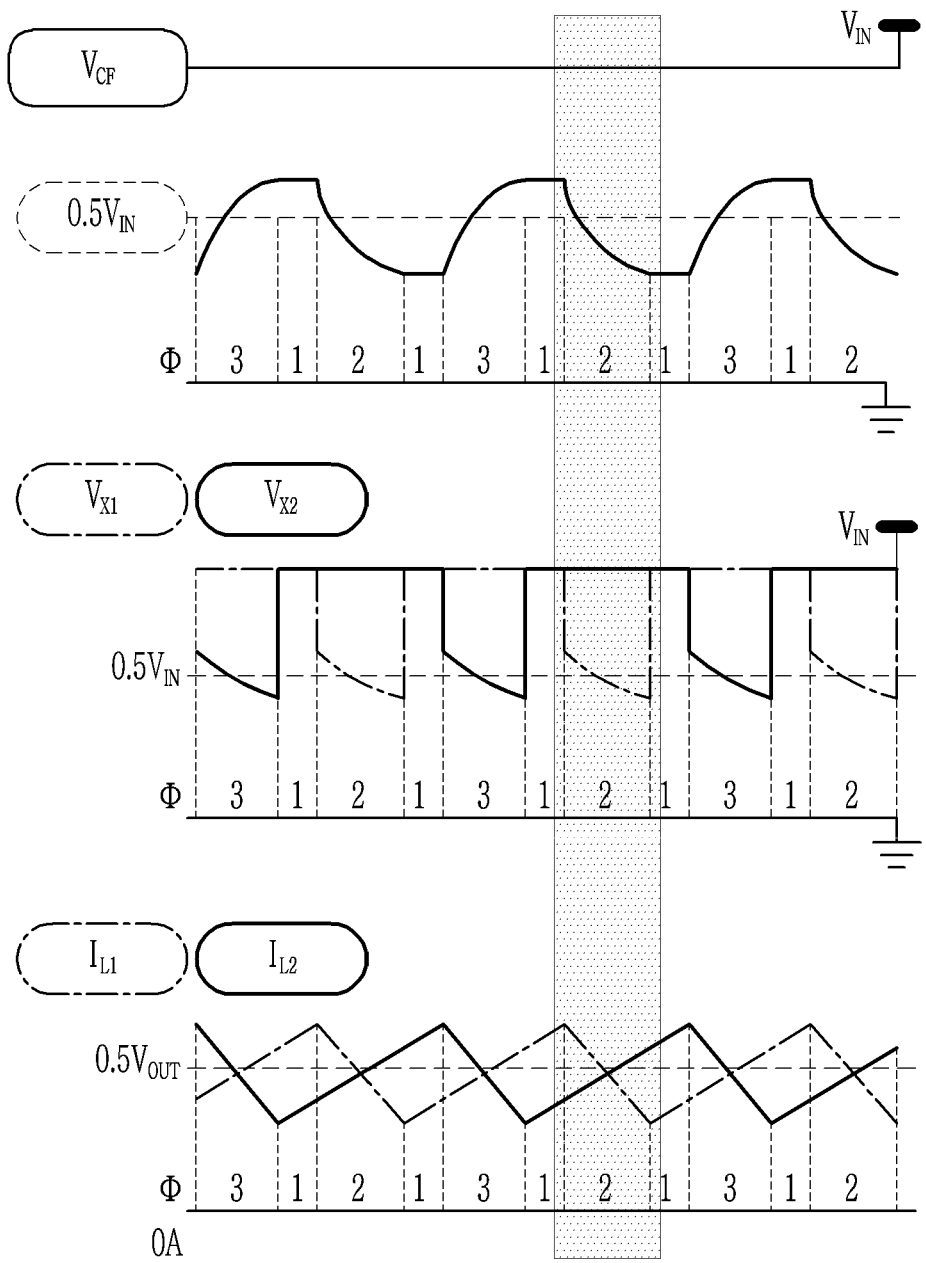

FIG. 4 and FIG. 5 illustrate an operation of a semiconductor device according to an embodiment.

Referring to FIG. 4, the semiconductor device 10 according to an embodiment may be operated in the second phase. In the second phase, the second connection switch M2 and the third connection switch M3 may be in the on state, and the first connection switch M1 and the fourth connection switch M4 may be in the off state.

In the second phase, the first inductor $L_1$ may be connected to the flying capacitor $C_F$ through the first node N1, and the first inductor $L_1$ may be de-energized by a potential difference that corresponds to the subtraction of the output voltage $V_{OUT}$ from the voltage $V_{CF}$ of the flying capacitor $C_F$. The second inductor $L_2$ may be energized by the potential difference that corresponds to the subtraction of the output voltage $V_{OUT}$ of the output node N4 from the input voltage $V_{IN}$ provided by the input node N0.

Referring to FIG. 5, the voltage $V_{CF}$ of the flying capacitor $C_F$ may fall in the second phase as the flying capacitor $C_F$ is discharged. In this instance, the first applying voltage $V_{X1}$ applied to the first node N1 may be 0.5 times the input voltage $V_{IN}$, and the second applying voltage $V_{X2}$ applied to the second node N2 may be equal to the input voltage $V_{IN}$ of the second node N2. The first inductor current $I_{L1}$ may fall to the region of a value that is less than 0.5 times the output current $I_{OUT}$ from the region of a value that is greater than 0.5 times the output current $I_{OUT}$, and the second inductor current $I_{L2}$ may increase to the region of a value that is greater than 0.5 times the output current $I_{OUT}$ from the region of a value that is less than 0.5 times the output current $I_{OUT}$.

In this instance, the first inductor current $I_{L1}$ may flow through the On-state second connection switch M2, and the second inductor current $I_{L2}$ may flow through the On-state third connection switch M3. That is, the two switches may be in the on state.

Figure 6:
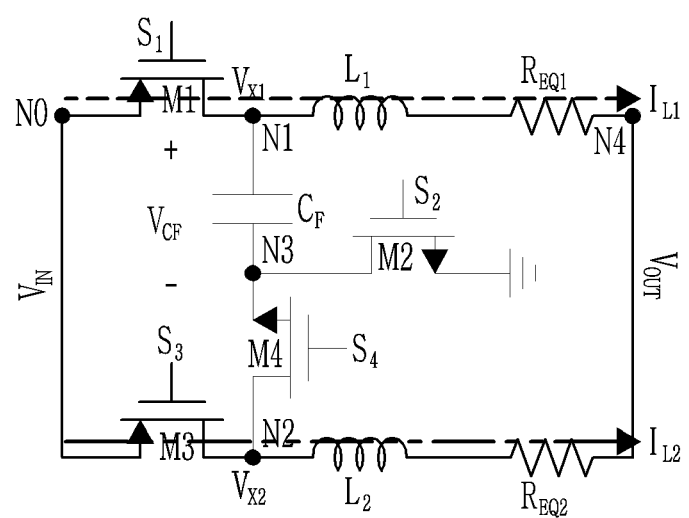
FIG. 6 and FIG. 7 illustrate an operation of a semiconductor device according to an embodiment.
Figure 7:
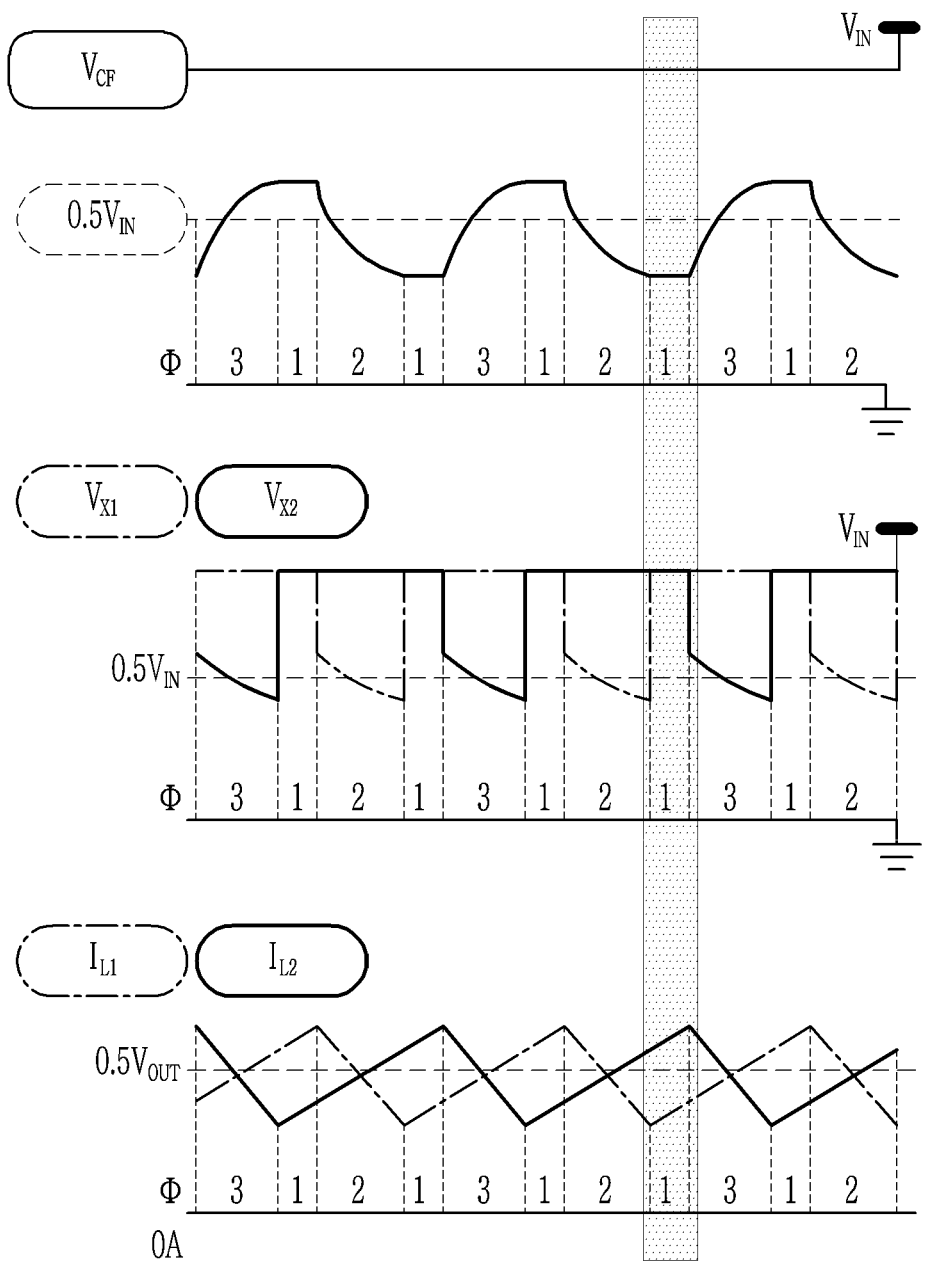

FIG. 6 and FIG. 7 illustrate an operation of a semiconductor device according to an embodiment.

Referring to FIG. 6, the semiconductor device 10 according to an embodiment may be operated in the first phase. In the first phase, the first connection switch M1 and the third connection switch M3 may be in the on state, and the second connection switch M2 and the fourth connection switch M4 may be in the off state.

In the first phase, the first inductor $L_1$ may be connected to the input node N0 through the first node N1, the second inductor $L_2$ may be connected to the input node N0 through the second node N2, and the first inductor $L_1$ and the second inductor $L_2$ may be energized by the potential difference that corresponds to the subtraction of the output voltage $V_{OUT}$ of the output node N4 from the input voltage $V_{IN}$ provided from the input node N0.

Referring to FIG. 7, the voltage $V_{CF}$ of the flying capacitor $C_F$ may have a value that is less than 0.5 times the input voltage $V_{IN}$ and may float in the first phase. The first applying voltage $V_{X1}$ applied to the first node N1 and the second applying voltage $V_{X2}$ applied to the second node N2 may be equal to the input voltage $V_{IN}$. The first inductor current $I_{L1}$ may increase in the region having a value that is less than 0.5 times the output current $I_{OUT}$, and the second inductor current $I_{L2}$ may increase in the region having a value that is greater than 0.5 times the output current $I_{OUT}$.

The first inductor current $I_{L1}$ may flow through the On-state first connection switch M1, and the second inductor current $I_{L2}$ may flow through the On-state third connection switch M3. That is, the two switches may be in the on state.

Figure 8:
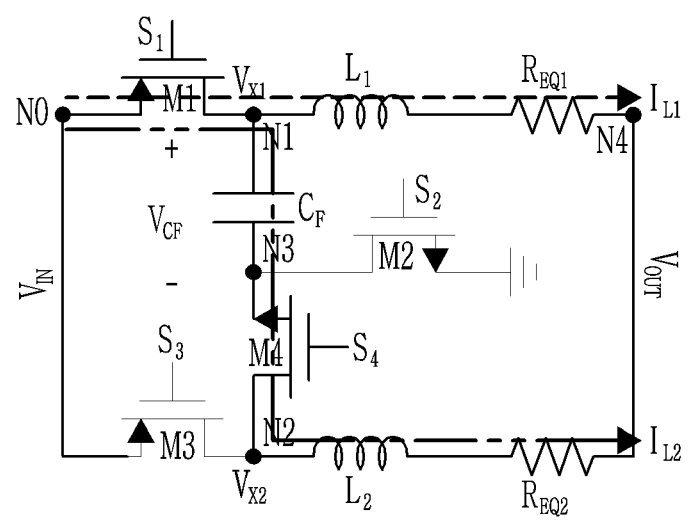
FIG. 8 and FIG. 9 illustrate an operation of a semiconductor device according to an embodiment.
Figure 9:
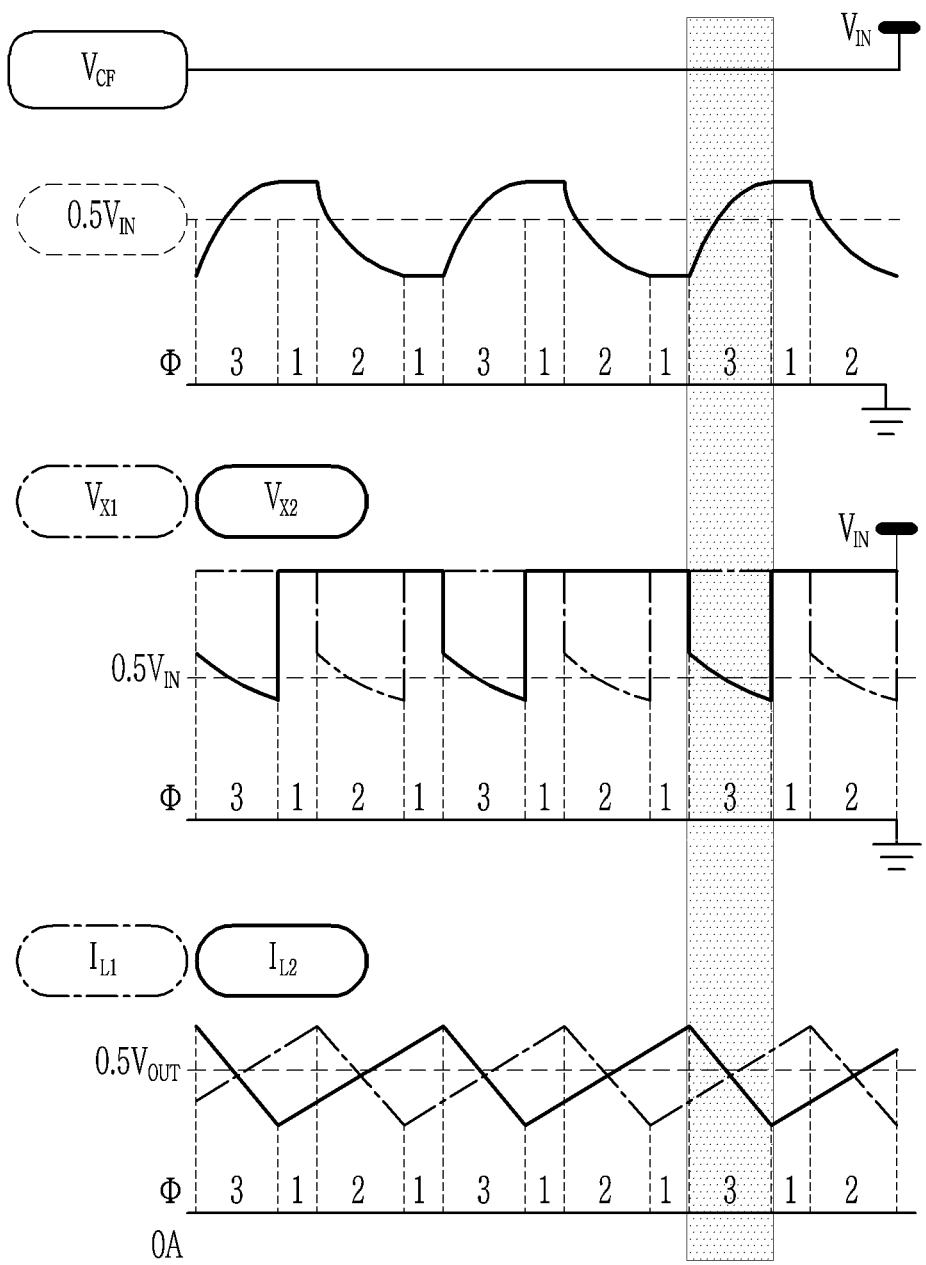

FIG. 8 and FIG. 9 illustrate an operation of a semiconductor device according to an embodiment.

Referring to FIG. 8, the semiconductor device 10 according to an embodiment may be operated in the third phase. In the third phase, the first connection switch M1 and the fourth connection switch M4 may be in the on state, and the second connection switch M2 and the third connection switch M3 may be in the off state.

In the third phase, the second inductor $L_2$ may be connected to the flying capacitor $C_F$ through the second node N2, and the second inductor $L_2$ may be de-energized by the potential difference that corresponds to the subtraction of the voltage $V_{CF}$ of the flying capacitor $C_F$ and the output voltage $V_{OUT}$ from the input voltage $V_{IN}$. The first inductor $L_1$ may be energized by the potential difference that corresponds to the subtraction of the output voltage $V_{OUT}$ of the output node N4 from the input voltage $V_{IN}$ provided from the input node N0.

Referring to FIG. 9, the voltage $V_{CF}$ at the flying capacitor $C_F$ may be increased in the third phase by charging the flying capacitor $C_F$. The first applying voltage $V_{X1}$ applied to the first node N1 may be equal to the input voltage $V_{IN}$, and the second applying voltage $V_{X2}$ applied to the second node N2 may be 0.5 times the input voltage $V_{IN}$. The first inductor current $I_{L1}$ may increase to the region having a value that is greater than 0.5 times the output current $T_{OUT}$ from the region having a value that is less than 0.5 times the output current $I_{OUT}$, and the second inductor current $I_{L2}$ may fall to the region having a value that is less than 0.5 times the output current $I_{OUT}$ from the region having a value that is greater than 0.5 times the output current $I_{OUT}$.

In this instance, the first inductor current $I_{L1}$ may flow through the On-state first connection switch M1, and the second inductor current $I_{L2}$ may flow through the On-state first connection switch M1 and the fourth connection switch M4. That is, the two switches may be in the on state.

As an average voltage at respective ends of the flying capacitor $C_F$ is maintained at about 0.5 times the input voltage $V_{IN}$, the semiconductor device 10 may still have an effect of reducing the number of the flying capacitors by one in comparison to the conventional two-phase three-level converter and reducing the size of the switching node voltage to half. When the number of the flying capacitors is reduced, a leakage of power resulting from bottom stray capacitance may be reduced. When the first phase, the second phase, the first phase, and the third phase are repeated, four connection switches are used, and one connection switch is included in a path on which the inductor current flows in the case of the first phase and the second phase so a conduction loss may be reduced. In addition, as the semiconductor device 10 is realized with a small number of flying capacitors and connection switches, an occupied chip area may be further reduced and power density may be increased in a condition of generating the same output.

Figure 10:
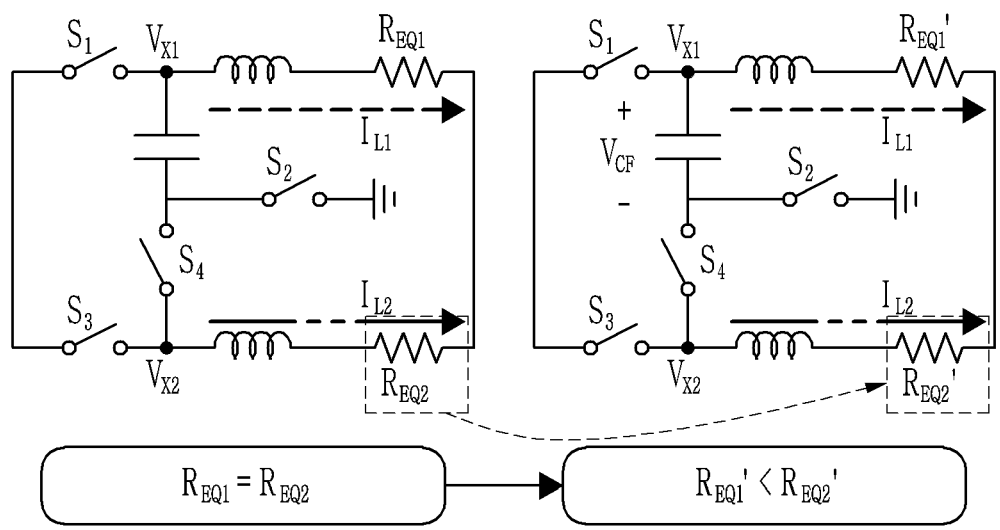
FIG. 10 and FIG. 11 illustrate an operation of a semiconductor device according to an embodiment.
Figure 11:
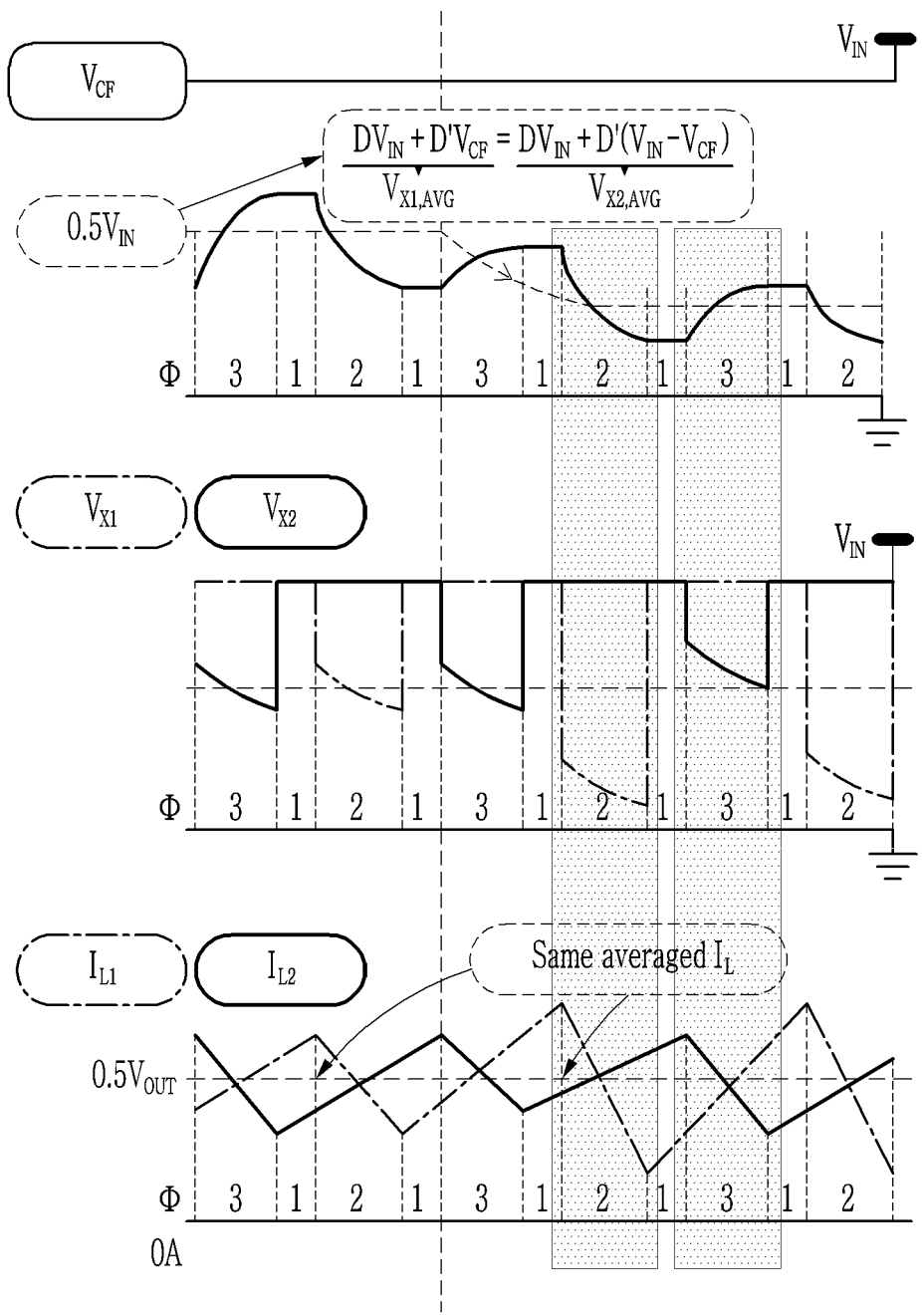

FIG. 10 and FIG. 11 illustrate an operation of a semiconductor device according to an embodiment.

Referring to FIG. 10, an unexpected resistor is added to the semiconductor device according to an embodiment so resistance of the first equivalent resistance $R_{EQ1}$ and the second equivalent resistance $R_{EQ2}$ may become imbalanced. Accordingly, the first inductor current $L_A$ of the first inductor $L_1$ may become different from the second inductor current $I_{L2}$ of the second inductor $L_2$. In this case, the voltage $V_{CF}$ of the flying capacitor $C_F$ is automatically adjusted so that the values of the first inductor current $L_{L1}$ and the second inductor current $I_{L2}$ may be adjusted to be equal to each other.

Referring to FIG. 11, when the first inductor current $I_{L1}$ of the first inductor $L_1$ becomes at least temporarily greater than the second inductor current $I_{L2}$ of the second inductor $L_2$, the voltage $V_{CF}$ of the flying capacitor $C_F$ may be reduced and adjusted so that the first inductor current $L_{L1}$ may be equal to the second inductor current $I_{L2}$.

In detail, when a charging amount of the flying capacitor $C_F$ is insufficient because of the relatively reduced second inductor current $I_{L2}$ in the third phase, the first applying voltage $V_{X1}$ may be reduced and the first inductor $L_1$ may be de-energized with the reduced first applying voltage $V_{X1}$ in the subsequent second phase, and the applied second applying voltage $V_{X2}$ may be increased and the second inductor $L_2$ may be de-energized with the increased second applying voltage $V_{X2}$ in the subsequent third phase. According to the above-noted adjustment, the first inductor current $I_{L1}$ and the second inductor current $I_{L2}$ may be adjusted to be identical to each other.

In another way, differing from what is shown with reference to FIG. 10 and FIG. 11, when the first inductor current $I_{L1}$ of the first inductor $L_1$ is at least temporarily less than the second inductor current $I_{L2}$ of the second inductor $L_2$, the voltage $V_{CF}$ of the flying capacitor $C_F$ may be increased and adjusted so that the first inductor current $I_{L1}$ may be identical with the second inductor current $I_{L2}$. In this case, the above-noted description may be applied to the method for adjusting the first inductor current $I_{L1}$ and the second inductor current $I_{L2}$ to be identical with each other in relation to the case in which the first inductor current $I_{L1}$ of the first inductor $L_1$ at least temporarily becomes greater than the second inductor current $I_{L2}$ of the second inductor $L_2$.

As described above, when the resistance of the first equivalent resistance $R_{EQ1}$ and the second equivalent resistance $R_{EQ2}$ are imbalanced, the semiconductor device according to an embodiment may perform self-current balancing to thus adjust the balance of the first inductor current $I_{L1}$ and the second inductor current $I_{L2}$.

Figure 12:
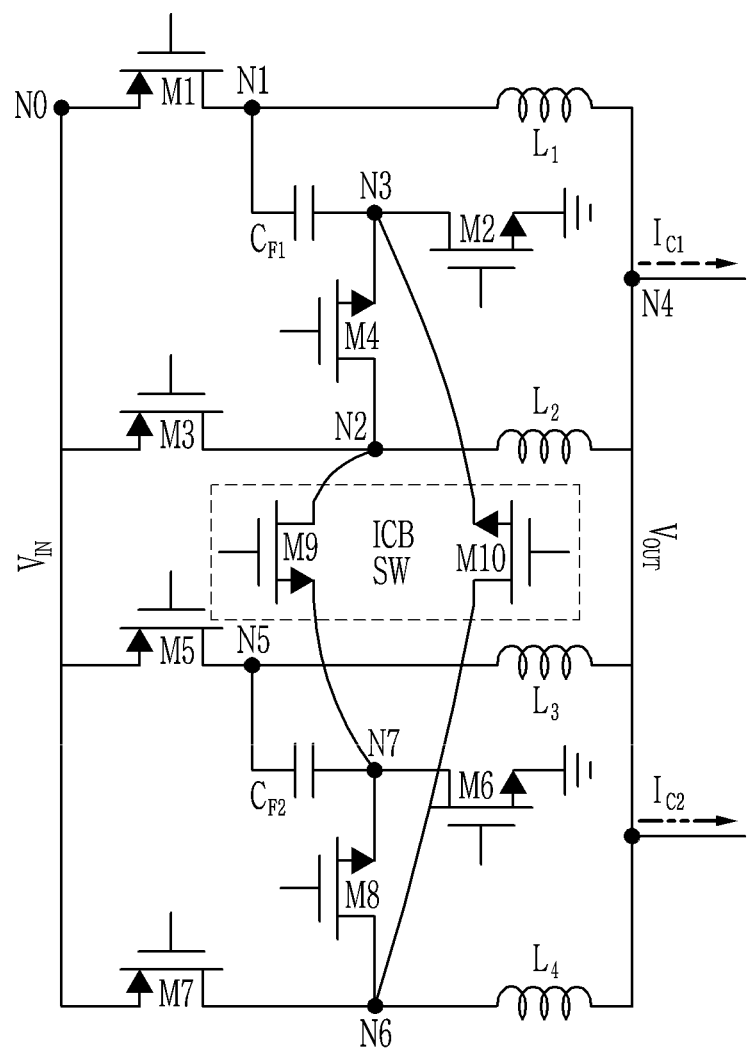
FIG. 12 illustrates a circuit diagram of a semiconductor device according to an embodiment.

FIG. 12 illustrates a circuit diagram of a semiconductor device according to an embodiment.

Referring to FIG. 12, the semiconductor device 12 according to an embodiment may have the topology of "4L2C" in which four inductors $L_1$, $L_2$, $L_3$, and $L_2$ share two flying capacitors $C_{F1}$ and $C_{F2}$ so that it may drive a greater load than in the above-described embodiment.

In detail, the semiconductor device 12 may include a first flying capacitor $C_{F1}$ connected between the first node N1 and the third node N3 and a second flying capacitor $C_{F2}$ connected between a fifth node N5 and a seventh node N7.

The semiconductor device 10 may include a first connection switch M1 between the input node N0 and the first node N1, a second connection switch M2 between the third node N3 connected to the first flying capacitor $C_{F1}$ and the ground node, a third connection switch M3 between the input node N0 and the second node N2, and a fourth connection switch M4 between the third node N3 connected to the first flying capacitor $C_{F1}$ and the second node N2.

The semiconductor device 10 may include a fifth connection switch M5 between the input node N0 and the fifth node N5, a sixth connection switch M6 between the seventh node N7 connected to the second flying capacitor $C_{F2}$ and the ground node, a seventh connection switch M7 between the input node N0 and a sixth node N6, and an eighth connection switch M8 between the seventh node N7 connected to the second flying capacitor $C_{F2}$ and the sixth node N6.

The semiconductor device 10 may include a ninth connection switch M9 connected between the second node N2 and the seventh node N7 and a tenth connection switch M10 connected between the third node N3 and the sixth node N6, and the ninth connection switch M9 and the tenth connection switch M10 may be referred to as an inter-channel balancer (ICB) switch.

A first end of the first inductor $L_1$ may be connected to the first flying capacitor $C_{F1}$ through the first node N1, and a second end thereof may be connected to the output node N4.

A first end of the second inductor $L_2$ may be connected to the first flying capacitor $C_{F1}$ through the fourth connection switch M4 between the second node N2 and the third node N3, and a second end thereof may be connected to the output node N4.

A first end of the third inductor $L_3$ may be connected to the second flying capacitor $C_{F2}$ through the fifth node N5, and a second end thereof may be connected to the output node N4.

A first end of the fourth inductor $L_4$ may be connected to the second flying capacitor $C_{F2}$ through the eighth connection switch M8 between the sixth node N6 and the seventh node N7, and a second end thereof may be connected to the output node N4.

Figure 13:
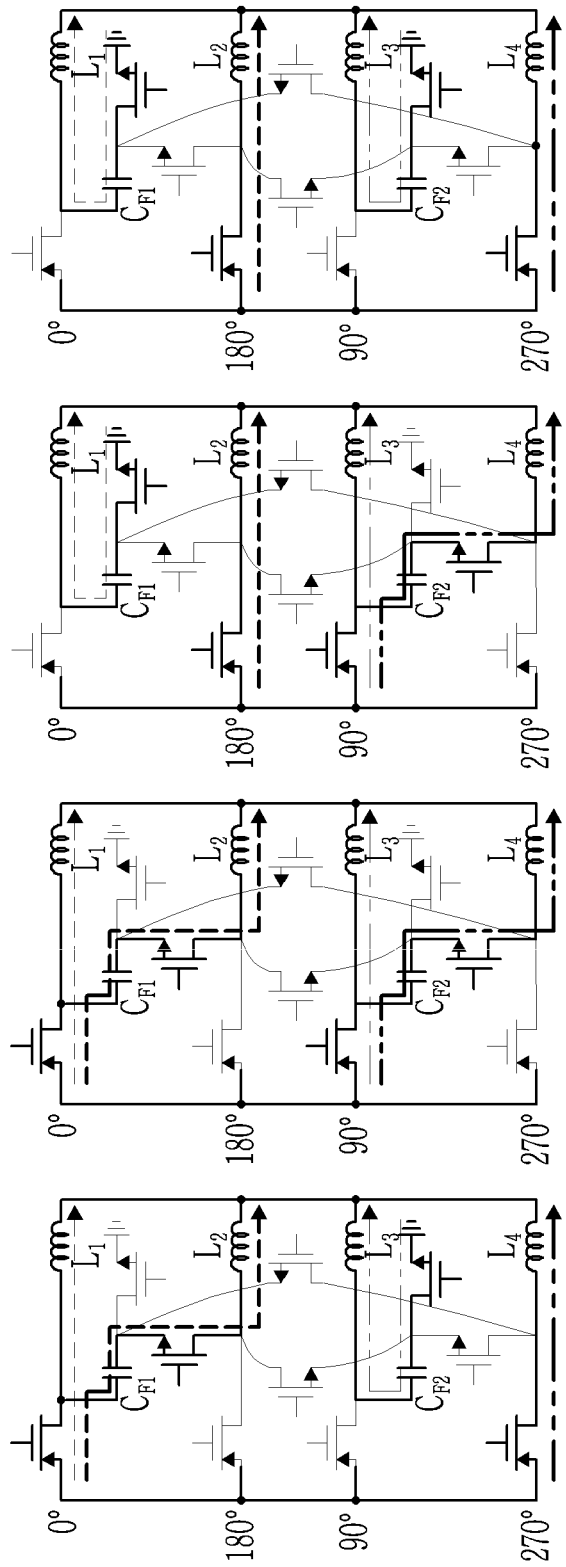
FIG. 13 illustrates an operation of a semiconductor device according to an embodiment.

FIG. 13 illustrates an operation of a semiconductor device according to an embodiment.

Referring to FIG. 13 together with FIG. 12, the semiconductor device according to an embodiment shows a non-ICB operation mode for disallowing performance of balancing of inter-channel currents $I_{C1}$ and $I_{C2}$. In this case, the first flying capacitor $C_{F1}$ may perform self-adjustment for identically adjusting the first inductor current $I_{L1}$ and the second inductor current $I_{L2}$, and the second flying capacitor $C_{F2}$ may perform self-adjustment for identically adjusting the third inductor current $I_{L3}$ and the fourth inductor current $I_{L4}$.

Referring to FIG. 12, the tenth connection switch M10 may be in the off state in the non-ICB operation mode in which the first inductor current $I_{L1}$ and the second inductor current $I_{L2}$ are adjusted according to a voltage change of the first flying capacitor $C_{F1}$, and the ninth connection switch M9 may be in the off state in the non-ICB operation mode in which the third inductor current $I_{L3}$ and the fourth inductor current $I_{L4}$ are adjusted according to a voltage change of the second flying capacitor $C_{F2}$.

The semiconductor device according to an embodiment may be operated according to a phase change as shown in FIG. 13 in the non-ICB operation mode.

Figure 14:
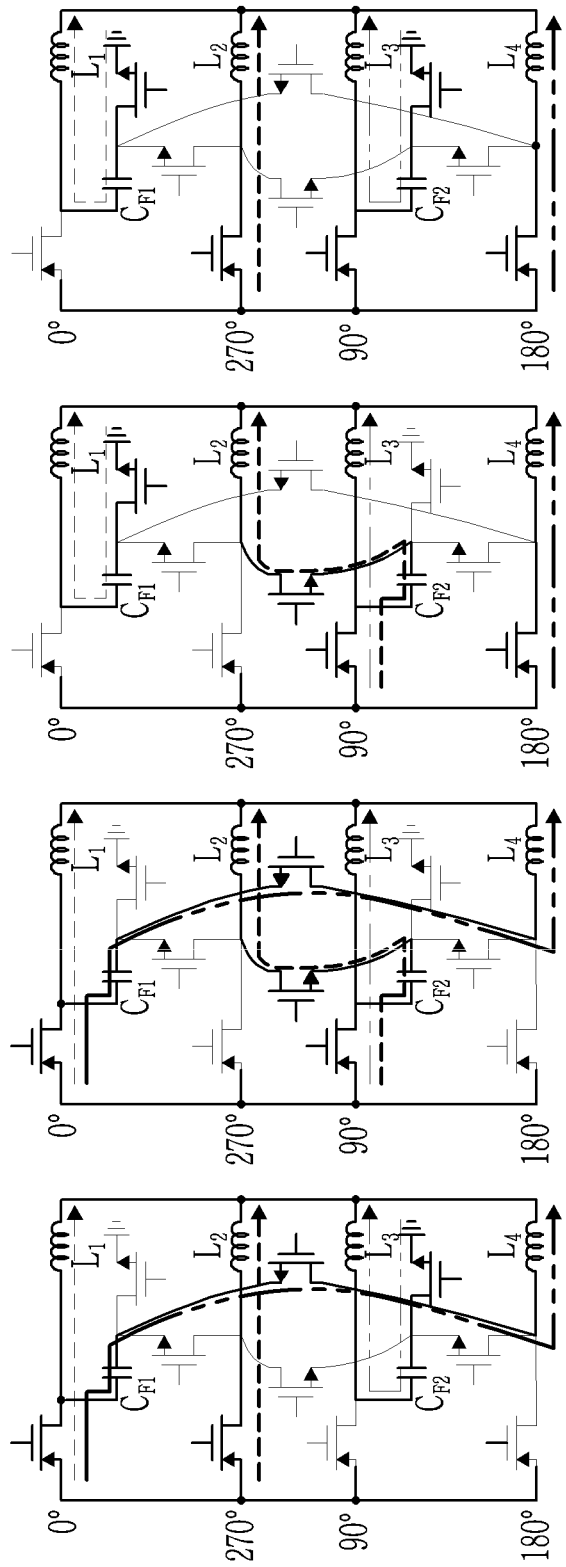
FIG. 14 illustrates an operation of a semiconductor device according to an embodiment.

FIG. 14 illustrates an operation of a semiconductor device according to an embodiment.

Referring to FIG. 14 together with FIG. 12, the semiconductor device in the ICB operation mode performs balancing of the inter-channel currents $I_{C1}$ and $I_{C2}$. In this case, the first flying capacitor $C_{F1}$ may perform cross-adjustment for identically adjusting the first inductor current $I_{L1}$ and the fourth inductor current $I_{L4}$, and the second flying capacitor $C_{F2}$ may perform self-adjustment for identically adjusting the second inductor current $I_{L2}$ and the third inductor current $I_{L3}$.

Further, referring to FIG. 12, the tenth connection switch M10 may be in the off state in the ICB operation mode in which the first inductor current $I_{L1}$ and the fourth inductor current $I_{L4}$ are adjusted according to a voltage change of the first flying capacitor $C_{F1}$, and the ninth connection switch M9 may be in the off state in the ICB operation mode in which the second inductor current $I_{L2}$ and the third inductor current $I_{L3}$ are adjusted according to a voltage change of the second flying capacitor $C_{F2}$.

The semiconductor device according to an embodiment may be operated according to a phase change as shown in FIG. 14 in the ICB operation mode.

FIG. 15 illustrates a block diagram of a semiconductor system according to an embodiment.

Referring to FIG. 15, the semiconductor system 1 may be realized with a mobile phone, a smartphone, a tablet computer, a personal digital assistant (PDA), an enterprise digital assistant (EDA), a digital still camera, a digital video camera, a portable multimedia player (PMP), a personal navigation device or a portable navigation device (PDN), a handheld game console, or a handheld device such as an e-book.

The semiconductor system 1 includes an SoC 100, a memory device 190, and a display device 195. The SoC 100 includes a central processing unit (CPU) 110, a read only memory (ROM) 120, a random access memory (RAM) 130, a timer 135, a graphics processing unit (GPU) 140, a clock management unit (CMU) 145, a display controller 150, a memory interface 170, and a bus 180. The SoC 100 may further include other constituent elements in addition to the shown constituent elements. The semiconductor system 1 may further include a power management unit (PMU) 160.

The PMU 160 is realized in the SoC 100 in the present embodiment, and the PMU 160 may be realized outside the SoC 100 in another embodiment.

The PMU 160 may include a DC-DC converter 10. The DC-DC converter 10 may convert the size of the DC voltage. For example, the DC-DC converter 10 may convert the input voltage $V_{IN}$ into the output voltage $V_{OUT}$, and the PMU 160 may be operated according to the output voltage VOUT.

The CPU 110, also referred to as a processor, may process or execute programs and/or data stored in the memory device 190. For example, the CPU 110 may process or execute the programs and/or the data in response to clock signals output by a clock signal generator (not shown).

The CPU 110 may be realized with a multi-core processor based on various embodiments. The multi-core processor is a computing component having two or more individual substantial processors (referred to as 'cores'), and the processors may respectively read and execute program instructions. The multi-core processor may simultaneously drive a plurality of accelerators, and a data processing system including the multi-core processor may perform multi-acceleration.

The programs and/or the data stored in the ROM 120, the RAM 130, and the memory device 190 may be loaded in the memory of the CPU 110.

The ROM 120 may store permanent programs and/or data. The ROM 120 may be realized with an erasable programmable read-only memory (EPROM) or an electrically erasable programmable read-only memory (EEPROM).

The RAM 130 may temporarily store programs, data, or instructions. For example, the programs and/or the data stored in the memory 120 or 190 may be temporarily stored in the RAM 130 according to control by the CPU 110 or booting code stored in the ROM 120. The RAM 130 may be realized with a dynamic RAM (DRAM) or a static RAM (SRAM) based on various embodiments.

The GPU 140 processes the data read by the memory controller 170 from the memory device 190 into displayable signals.

The CMU 145 may generate operation clock signals and may control outputting of the operation clock signals. The CMU 145 may include a clock generating device and a clock controller, such as a phase locked loop (PLL) circuit, a delayed locked loop (DLL), or a crystal. The CMU 145 may supply operation clock signals to the respective constituent elements 110, 120, 130, . . . , 170.

The memory interface 170 represents a block for interfacing with the memory device 190. The memory interface 170 generally controls the operation of the memory device 190, and also controls data exchanges between the host and the memory device 190. For example, the memory interface 170 writes data on the memory device 190 or reads data from the memory device 190 according to a request by the host.

Here, the host may be a processing unit such as the CPU 110, the GPU 140, or the display controller 150.

The memory device 190 stores data including an operating system (OS), various types of programs, and various types of data. The memory device 190 may be a DRAM, but is not limited thereto. For example, the memory device 190 may be a non-volatile memory device (a flash memory, a phase-change RAM, a PRAM, a magnetoresistive RAM, a MRAM, a resistive RAM, a ReRAM, a ferroelectric RAM, or an FeRAM device). According to another embodiment of the present disclosure, the memory device 190 may be a memory installed in the SoC 100.

The respective constituent elements 110, 120, 130, 140, 150, 160, and 170 may communicate with each other through a bus 180.

The display device 195 may generate display synchronization signals, and may display output video signals provided by the display controller 150 according to the display synchronization signal. The display synchronization signal may be a vertical synchronization signal (VSYNC). The display device 195 may be realized with a liquid crystal display (LCD), a light emitting diode (LED), an organic LED (OLED), or an AMOLED (active-matrix OLED) device.

The display controller 150 controls the operation of the display device 195.

While the inventive subject matter has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

What is claimed is:

1. A semiconductor device comprising:
   a flying capacitor connected between a first node and a second node;
   a first inductor having a first end connected to the flying capacitor through the first node and a second end connected to an output node; and
   a second inductor having a first end connected to the flying capacitor through the second node and a second end connected to the output node,
   wherein the semiconductor device is configurable in a plurality of different states based on a plurality of different operational phases, and
   wherein the flying capacitor is configured to float in a first phase, is configured to be discharged through the first inductor in a second phase that is different from the first phase, and is configured to be charged through the second inductor in a third phase that is different from the first phase and the second phase.

2. The semiconductor device of claim 1, wherein in the first phase:
   the first inductor is electrically connected to an input node through the first node,
   the second inductor is electrically connected to the input node through the second node, and
   the first inductor and the second inductor are energized by a difference between an input voltage at the input node and an output voltage at the output node.

3. The semiconductor device of claim 2, further comprising:
   a first connection switch between the input node and the first node; and
   a second connection switch between the input node and the second node,
   wherein the first connection switch and the second connection switch are in an on state in the first phase.

4. The semiconductor device of claim 3, wherein in the second phase:
   the first inductor is electrically connected to the flying capacitor through the first node, and
   the first inductor is de-energized by a difference between a voltage at the flying capacitor and the output voltage.

5. The semiconductor device of claim 4, wherein a first applying voltage for the first inductor applied to the first node is 0.5 times the input voltage.

6. The semiconductor device of claim 4, further comprising
   a third connection switch between a third node connected to the flying capacitor and the ground node,
   wherein the third connection switch is in the on state in the second phase.

7. The semiconductor device of claim 3, wherein in the third phase:
   the second inductor is electrically connected to the flying capacitor through the second node, and
   the second inductor is de-energized by a difference between the input voltage and a sum of the voltage at the flying capacitor and the output voltage.

8. The semiconductor device of claim 7, wherein a second applying voltage for the second inductor applied to the second node is 0.5 times the input voltage.

9. The semiconductor device of claim 7, further comprising
   a fourth connection switch between a third node connected to the flying capacitor and the second node,
   wherein the fourth connection switch is in the on state in the third phase.

10. The semiconductor device of claim 1, wherein
    when a first inductor current of the first inductor becomes greater than a second inductor current of the second inductor,
    a voltage at the flying capacitor is reduced so that the first inductor current becomes identical to the second inductor current, and
    when the first inductor current of the first inductor becomes less than the second inductor current of the second inductor,
    the voltage at the flying capacitor is increased so that the first inductor current becomes identical to the second inductor current.

11. A semiconductor device comprising:
    a first connection switch configured to selectively supply an input voltage to a first inductor and a first end of a flying capacitor;
    a second connection switch configured to selectively supply a ground voltage to a second end of the flying capacitor;
    a third connection switch configured to selectively supply the input voltage to a first end of a second inductor; and
    a fourth connection switch configured to supply a voltage at the second end of the flying capacitor to the first end of the second inductor.

12. The semiconductor device of claim 11, wherein in the first phase,
the first connection switch and the third connection switch are in an on state,
the second connection switch and the fourth connection switch are in an off state, and
the first inductor and the second inductor are energized by a difference between the input voltage and an output voltage at an output node, the first inductor being connected between the output node and the flying capacitor.

13. The semiconductor device of claim 11, wherein in the second phase,
the second connection switch and the third connection switch are in an on state,
the first connection switch and the fourth connection switch are in an off state,
the first inductor is de-energized by a difference between a voltage at the flying capacitor and an output voltage at an output node, the first inductor being connected between the output node and the flying capacitor, and
the second inductor is energized by a difference between the input voltage and the output voltage.

14. The semiconductor device of claim 13, wherein a first applying voltage for the first inductor is 0.5 times the input voltage.

15. The semiconductor device of claim 11, wherein in the second phase,
the first connection switch and the fourth connection switch are in an on state,
the second connection switch and the third connection switch are in an off state,
the first inductor is energized by a difference between the input voltage and an output voltage at an output node, the first inductor being connected between the output node and the flying capacitor, and
the second inductor is de-energized by a difference between the input voltage and a sum of a voltage at the flying capacitor and the output voltage.

16. The semiconductor device of claim 15, wherein a second applying voltage for the second inductor applied to the second node is 0.5 times the input voltage.

17. The semiconductor device of claim 11, wherein
when a first inductor current of the first inductor becomes greater than a second inductor current of the second inductor,
a voltage at the flying capacitor is reduced so that the first inductor current becomes identical to the second inductor current, and
when the first inductor current of the first inductor becomes less than the second inductor current of the second inductor,
the voltage at the flying capacitor is increased so that the first inductor current becomes identical to the second inductor current.

18. A semiconductor device comprising:
a first flying capacitor connected between a first node and a third node;
a second flying capacitor connected between a fifth node and a seventh node;
a first inductor having a first end connected to the first flying capacitor through the first node and a second end connected to an output node;
a second inductor having a first end connected to the first flying capacitor through a first connection switch between a second node and the third node and a second end connected to the output node;
a third inductor having a first end connected to the second flying capacitor through the fifth node and a second end connected to the output node;
a fourth inductor having a first end connected to the second flying capacitor through a second connection switch between a sixth node and the seventh node and a second end connected to the output node;
a third connection switch connected between the second node and the seventh node; and
a fourth connection switch connected between the third node and the sixth node.

19. The semiconductor device of claim 18, wherein
the fourth connection switch is in an off state in an operation mode in which a first inductor current of the first inductor and a second inductor current of the second inductor are adjusted based on a voltage change of the first flying capacitor, and
the fourth connection switch is in an on state in an operation mode in which the first inductor current of the first inductor and a fourth inductor current of the fourth inductor are adjusted based on the voltage change of the first flying capacitor.

20. The semiconductor device of claim 18, wherein
the third connection switch is in an off state in an operation mode in which a third inductor current of the third inductor and a fourth inductor current of the fourth inductor are adjusted based on a voltage change of the second flying capacitor, and
the third connection switch is in an on state in an operation mode in which a second inductor current of the second inductor and a third inductor current of the third inductor are adjusted based on the voltage change of the second flying capacitor.

* * * * *